United States Patent [19]
Marion et al.

[11] 3,760,572
[45] Sept. 25, 1973

[54] MISSILE DEFLECTOR SYSTEM FOR ROTARY MOWER

[75] Inventors: James E. Marion; Joseph E. Scanland, both of Kankakee, Ill.

[73] Assignee: Roper Corporation, Kankakee, Ill.

[22] Filed: Dec. 30, 1971

[21] Appl. No.: 214,190

[52] U.S. Cl. ............................................. 56/320.2
[51] Int. Cl. ........................................... A01d 35/26
[58] Field of Search .................. 56/17.2, 17.4, 17.5, 56/202, 255, 295, 320.2

[56] References Cited
UNITED STATES PATENTS

| | | | |
|---|---|---|---|
| 3,648,445 | 3/1972 | Efflandt | 56/320.2 |
| 3,420,041 | 1/1969 | Irgens | 56/320.2 |
| 2,756,556 | 7/1956 | Watkins | 56/320.2 X |
| 3,503,194 | 3/1970 | Ritums | 56/255 |
| 3,049,853 | 8/1962 | Horner et al. | 56/320.2 X |
| 2,910,818 | 11/1959 | Beal et al. | 56/320.2 |

*Primary Examiner*—Louis G. Mancene
*Assistant Examiner*—J. A. Oliff
*Attorney*—C. Frederick Leydig et al.

[57] ABSTRACT

A missile deflector system for a rotary mower of the type having a blade and inverted housing providing a throat for lateral discharge of clippings which includes a deflector plate extending transversely across the lower portion of the throat in the plane of the blade for intercepting missiles ejected by the blade and for causing the missiles to be deflected upwardly at an angle. An inverted chute or intercepting shield is arranged in the upper portion of the chute and in the path of movement of the deflected missiles so that the missiles ricochet downwardly at a sharp angle toward the ground while the clippings pass through unimpeded. Means are provided for inhibiting removal of the intercepting shield from its missile-intercepting position as long as the deflector plate is in place thereby guarding against the possible hazard of high trajectory missiles being ejected from the mower. In the preferred embodiment the latter function is accomplished by interconnecting the deflector plate and the shield, or chute, with a short length of chain.

1 Claim, 4 Drawing Figures

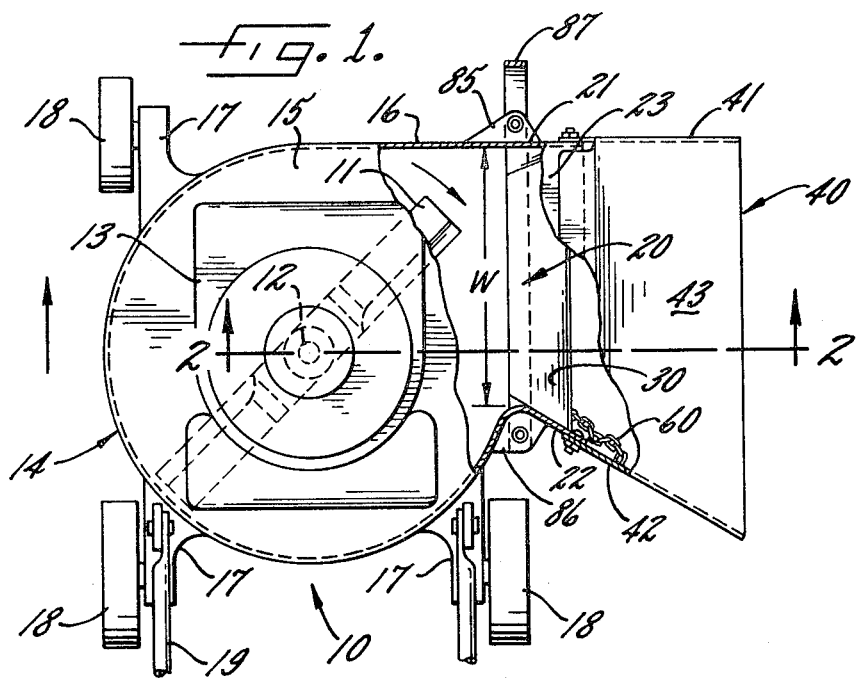
Fig. 1.
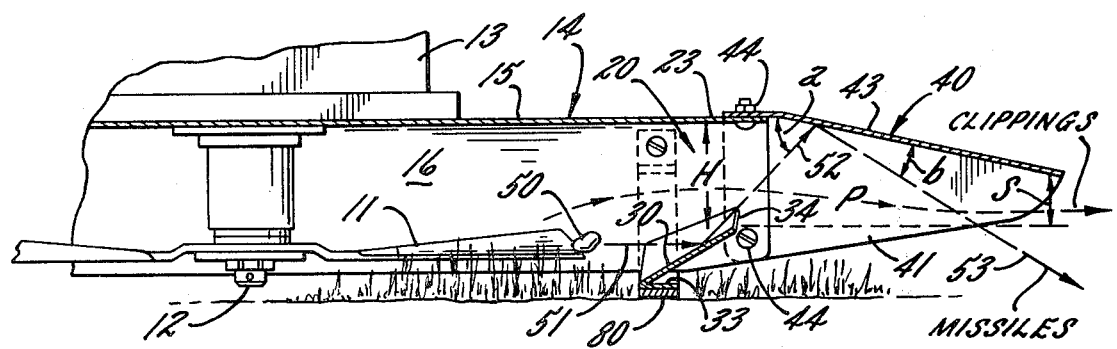
Fig. 2.
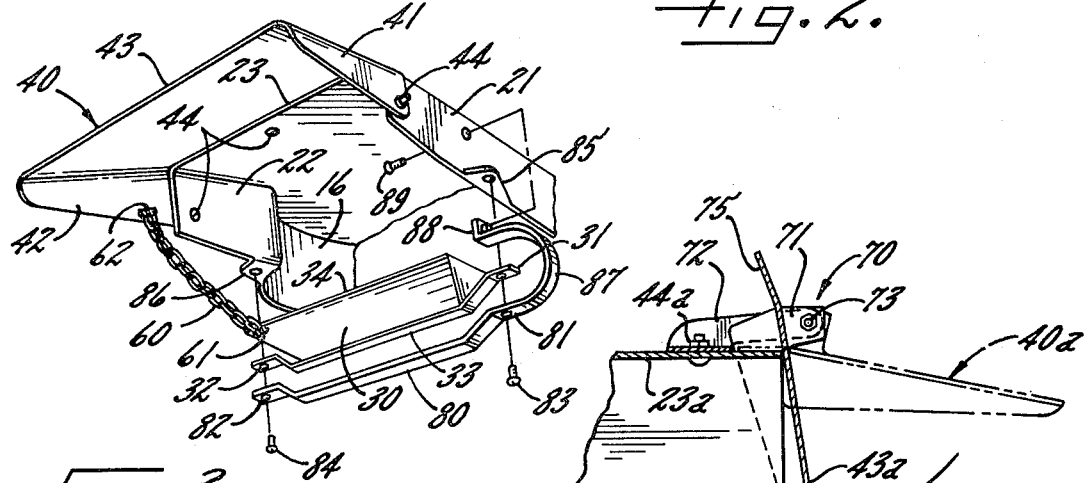
Fig. 3.
Fig. 4.

MISSILE DEFLECTOR SYSTEM FOR ROTARY MOWER

The ejection of missiles such as stones, sticks and casual pieces of metal upon impact by the blade of a rotary mower creates a hazard which has been considered inherent in mowers of the rotary type. In an effort to intercept such missiles resort has been had to downwardly angled and elongated discharge chutes and chute extensions. However, this has not proved to be the answer to the problem since low trajectory missiles are not prevented from escaping and since downward angling of the chute at an abrupt angle inhibits airflow and free distribution of the clippings over a broad area resulting in a "windrow".

It is an object of the present invention to provide a missile deflector system for a mower which practically insures against the escape of dangerous missiles but which has very little effect upon the flow of air and clippings through the mower throat so that the clippings are evenly distributed over a broad area. It is a related object to provide a missile deflector system in which missiles, which are relatively dense, are caused to follow one path in the mower throat while the clippings which are light and air-borne follow quite a different and unimpeded path. It is a related object to provide a missile deflector system which acts selectively upon missiles and which avoids hangup or clogging by clippings under wet, heavy grass conditions.

It is yet another object of the present invention to provide a missile deflector system which includes a deflector plate in the plane of the blade for deflecting missiles angularly upward and a shield, or discharge chute, for intercepting the missiles and ricocheting them downwardly at a sharp angle toward the ground and in which provision is included for substantially insuring that the shield will not be removed and omitted from the mower as long as the deflector plate remains in place, thereby overcoming the possible hazard which might exist from high trajectory missiles if the deflector plate were allowed to act upon the missiles alone.

It is a general object of the present invention to provide a missile deflector system which is inexpensive, adding only a few cents to the cost of the mower but which is highly effective and which is of practically universal application being usable with rotary mowers of widely different size and specific design.

Other objects and advantages of the invention will become apparent upon reading the attached detailed description and upon reference to the drawings in which:

FIG. 1 is a plan view of a push-type mower employing the present invention and with the housing broken away to reveal the deflector plate.

FIG. 2 is a fragmentary section looking along the line 2—2 in FIG. 1.

FIG. 3 is an underside perspective view, partly exploded, showing the deflector plate and shield assembly, with the shield being bolted to the mower housing.

FIG. 4 is a fragmentary vertical section showing a modified construction in which the intercepting shield is permanently secured to the mower housing but rockable downwardly for compactness in shipment or storage.

While the invention has been described in connection with certain preferred embodiments, it will be understood that we do not intend to be limited to the particular embodiment shown, but intend, on the contrary, to cover the various alternative and equivalent forms of the invention included within the spirit and scope of the appended claims.

Turning now to the drawings there is shown in FIGS. 1 and 2 a rotary mower 10, here of the manually pushed type having a rotary blade 11 which is spaced slightly above, and parallel to, the ground surface and which is mounted upon a shaft 12 driven by an engine or motor 13. The blade is bent to provide the usual windage or air steam. Enclosing and surrounding the blade is a housing 14 of shallow inverted construction having a flat top surface 15 and a downwardly turned edge or skirt 16. Secured to the housing, and forming an integral part thereof, are wheel mounts 17 journaling wheels 18. The mower is propelled by pushing upon a suitable handle 19. However, the invention is not limited to manual propulsion, and the improved mower unit may be connected, by suitable linkage, to the underside of a garden tractor or similar vehicle to form a riding mower.

In accordance with the present invention, a relatively wide throat is provided for lateral discharge of the clippings with a deflector plate extending transversely across the lower portion of the throat in the plane of the blade and angled upwardly for deflection of missiles forcibly struck by the blade. A chute member or shield is provided downstream from the deflector plate for intercepting the deflected missiles and for ricocheting them downwardly at a sharp angle with respect to the ground while the clippings pass unobstructedly outward with the air stream. As shown in the drawing, the wall 16 of the housing is open at the right-hand side to form a throat 20 bounded by throat side walls, or flanges, 21, 22, integral with an upper wall 23. Extending transversely of the throat is a deflector plate 30 having a mounting tab 31 at one end and a mounting tab 32 at the other which serves to position the deflector plate in the lower portion of the throat 20 and in the plane of the blade 11. The lower edge of the deflector plate is bent to form a base portion 33, and the plate is of such width that the upper edge 34 thereof provides a substantial amount of headroom H. This dimension, combined with the width W indicated in FIG. 1 results in a large total unobstructed area for passage of the clippings along a generally horizontal path P.

For deflecting the missiles angularly upward the deflector plate 30 is inclined at a shallow angle, an angle which, in a practical case, may range between 20° and 40°. For intercepting the upwardly deflected missiles and ricocheting them downwardly at a sharp angle toward the ground, an intercepting shield, or chute, 40 is provided having side walls 41, 42 and a top wall 43, the shield, or chute, being secured to the housing structure by means of bolts 44 which engage registering holes. The chute 40 is thus of inverted channel shape forming a continuation of the throat 20. The upper wall of the chute 43 is preferably angled downwardly from the horizontal at a shallow angle, an angle which is preferably within the range of 5° and 15° and in any event sufficiently shallow so as to give a net clearance spacing S, with respect to the plate 30 with minimum obstructing effect upon the ejected clippings so that the cliipings are ejected at high velocity and distributed evenly and over a wide area.

As a result of the coooperating action of the angled deflector plate 30 in the plane of the blade and the shield, or chute, member 40, a typical stone or other missile impacted by the blade is caused to follow a three-legged ricocheted path, resulting in final ejection at a relatively sharp angle downwardly toward the ground while the clippings, being light and air-borne, follow a relatively straight free path. Thus a missile, for example, the stone indicated at 50, which may be picked up by the blade, follows a horizontal path 51 until striking the presented and angled surface of the deflector plate 30. The deflector plate causes the missile to be directed angularly upward along the path 52 until intercepted by the shield 40. The missile then ricochets downwardly along a path 53 which forms a relatively sharp angle with respect to the ground. It might be assumed that during the course of such ricocheted movement the angle of reflection, or departure, would be substantially equal to the angle of incidence, or entry. In a practical case these angles are not equal and the angle of departure will normally be less than the angle of entry as illustrated in FIG. 2 of the drawing, comparing the departure angle $b$ with the entry angle $a$. In the present construction the angling of the deflector plate 30 and the intercepting shield 40 and the length of the intercepting shield are such as to insure that the missile will be deflected downwardly toward the ground even where the angle $b$ is substantially less than the angle $a$.

In conventional constructions the path of a stone or other missile, in exiting from the mower, is not much different from the path followed by the clippings. However, in the present construction it may be noted that the sharply ricocheted path of the missile differs substantially from the path P of the clippings, crossing the path of the clippings twice, at 52 and at 53, prior to exiting. Because of the sharp angle at which the missile strikes the ground along the final leg 53, the velocity and energy of the missile will be quickly dissipated so that the missile cannot become a hazard. This is true regardless of the shape of the missile, whether it be in the form of a rounded pebble or in the form of a sharp nail or other fragment of metal. The missile is thus disposed of without affecting the free flow and distribution of the clippings.

In accordance with one of the important aspects of the present invention, means are provided for insuring that the mower cannot be operated with the deflector plate 30 in place but without the cooperating shield 40. This is accomplished in the preferred form of the invention by connecting the shield 40 to the deflector plate 30 so that the two are integral with one another so that one cannot be completely removed and omitted without the other. This is accomplished in the present instance by securing a short length of flexible connector, here in the form of a chain 60, which is welded, at its respective ends 61, 62 to adjacent portions of the plate 30 and shield 40. If desired, a short length of steel cable may be substituted for the length of chain. In any event, the flexibility of the connection 60 permits the shield, or chute, 40 to be dismounted, by removing the bolts 44, so that, during shipment, the chute may be compactly stowed and the dimension of the shipping container substantially reduced. The fact that the chute is connected to the structure by a connecting element insures that the recipient, when the unit is unpacked, will, in fact, take prompt steps to mount the chute using the bolts provided, thereby insuring that the mower will not be employed under conditions where a missile will pass from the mower along a high and possibly hazardous trajectory 52.

As an alternate form of the present invention, the chute or shield may be hingedly mounted so that it is permanently secured to the mower housing and may be tilted downwardly for the sake of compactness during shipment or storage while being provided with stops to limit the degree of upward swing to a working position thereby to insure that the member cannot be swung beyond a position of intercept. Thus, referring to FIG. 4, where corresponding reference numerals are employed, with subscript $a$, to denote corresponding elements, the chute or shield 40a has side walls 41a, 42a and a generally horizontal intercepting surface 43a. The member 40 is secured to the mower housing by a hinge structure 70 which includes tabs 71 integral with the member 40 cooperating with a pair of brackets 72 having alined holes which engage a horizontal hinge pin 73. The brackets 72 may be secured to the throat portion of the mower housing either by welding or by use of machine screws 44a.

To prevent the chute member 40a from moving upwardly beyond the working position shown by the dot-dash lines, the member 40a has an extension or stop surface 75 which, when swung fully counterclockwise, seats against the top surface of the mower housing. It will be seen, then, that there are only two possible limit positions for the chute 40a: a downwardly extending position in which the throat is fully obstructed and an upwardly swung, working position in which the member is sure to intercept missiles deflected by the plate 30. Where a hinge is used, complete with a limit stop, for permanent retention of the chute as shown in FIG. 4, the fastenings provide sufficient inhibition against removal thereby forming an effective substitute for the inhibiting effect of the flexible connector or chain 60. Indeed, in the "hinged" version the threads on the screws 44a and at the end, or ends, of the hinge pin 73 may be peened over to prevent loosening or removal or, if desired, rivets may be substituted for the threaded elements.

It is a further feature of the present invention that the deflector plate 30 is integrated with a reinforcing runner which extends along the lower edge of the deflector plate to prevent it from being worn or bent by the striking of irregularities or obstructions during the mowing operation. Thus, we provide a runner 80 having mounting pads 81, 82 and which is bent into typical runner shape conforming to the underside of the deflector plate 30 and with the tabs on the two members having alined holes for the reception of fastening bolts 83, 84 which engage mounting flanges 85, 86 integral with the mower housing. The runner 80 may, in addition, be extended at its forward end as indicated at 87 to provide a rounded bumper which is anchored at its end 88 to the side wall of the mower housing by a screw 89 or the like.

As will be seen in FIG. 2 the runner 80 conforms closely to the lower edge 33 of the plate 30 so that the members 30, serve mutually to reinforce one another to resist bending when a casual ground obstruction, such as a large partially buried rock, is encountered.

In the preferred construction described above the chute 40, or its counterpart 40a, which acts as an intercepting shield serves also to guide and conduct the clippings outwardly from the mower housing. However, it will be apparent to one skilled in the art that, if desired, a separate intercepting shield may be provided in the form of a relatively narrow plate of metal mounted below the regular chute structure in the missile path 52 and which has a length, transversely of the throat, which corresponds to the length of the deflector plate 30.

The term "removal and omission" as used herein applied to the chute or shield member 40 has to do with the fact that the member can be unstepped or moved from its horizontal position to a vertical position for compactness but cannot be omitted from the mower structure during usage because of the inhibiting effect of its connection to the mower housing, particularly where a flexible connector such as that shown at 60 is employed. Moreover, the invention is not limited to a chute or shield 40 which is movable or which may be unstepped since, if desired, the chute may be formed integrally with the mower housing while still achieving much of the benefit of the present invention.

While the great majority of missiles struck by the blade will have an initial trajectory lying close to the plane of the blade and are thus sure to be deflected by the plate 30, it is conceivable that a missile might be given a glancing blow which might direct it through the "net" clearance space "S" but, because of the axial length of the shield and its downward angling, the effective escape angle is extremely narrow so that the possibility of escape is relatively remote.

The present invention has been found to be so effective as to reduce the missile hazard from a rotary mower to a point where it is almost negligible so that efficiently high blade speeds may be employed, speeds which may be even higher than levels which have been considered safe heretofore. Moreover, the benefit of the invention is achievable at low cost in a wide variety of rotary mower sizes and designs. The deflector plate 30 may be incorporated in new designs of mowers or may be added as a modification kit to mowers which are already in the field.

1. In a rotary mower the combination comprising a rotary blade having means for supporting the same slightly spaced above the ground and for rotating at high speed, a housing of shallow inverted construction surrounding the blade and having a discharge throat which extends laterally with respect to the direction of movement of the mower, a ground engaging runner bridging the lower portion of the throat, a deflector plate detachably mounted upon the runner and extending across the lower portion of the throat in the plane of the blade for intercepting missiles forcibly struck by the blade and preventing direct passage thereof through the throat while leaving the region above the deflector plate free for passage of grass clippings, an intercepting shield detachably mounted to the housing and extending across the upper portion of the throat in a generally horizontal position, the deflector plate being angled upwardly to cause any missiles struck by the blade to be deflected upwardly onto the underside of the intercepting shield and the intercepting shield being angled slightly downwardly to cause such missiles to ricochet downwardly toward the ground at a sharp angle with respect to the clippings which are discharged outwardly, the runner and deflector plate having registering ends with common means for securing the ends to the mower housing and with the runner and deflector plate lying closely side by side so that each reinforces the other against possible deformation upon striking of an object lying upon the ground, and means for inhibiting removal and omission of the intercepting shield from the mower structure without removal of the deflector plate.

* * * * *